United States Patent [19]
Carlson

[11] 3,808,885
[45] May 7, 1974

[54] SPRING TESTER
[76] Inventor: Harold C. R. Carlson, 611B Lake Point Dr., Lakewood, N.J. 08701
[22] Filed: July 19, 1972
[21] Appl. No.: 273,116

[52] U.S. Cl. .................................. 73/161, 73/93
[51] Int. Cl. ......................................... G01l 1/04
[58] Field of Search ................... 73/161, 93, 94, 95

[56] References Cited
UNITED STATES PATENTS
3,013,430  12/1961  Boyden ............................. 73/161
3,618,381  11/1971  Beger ................................ 73/161

OTHER PUBLICATIONS
Elasticometer Spring Testing Machines; brochure of Carlson Company, dated in Patent Office Jan. 7, 1961.

Primary Examiner—Richard C. Queisser
Assistant Examiner—Denis E. Corr
Attorney, Agent, or Firm—Leonard H. King

[57] ABSTRACT

A multi-function spring tester is provided for testing the compression and extension loads, deflections and rates of springs. A balance beam system is used for test purposes and permits production testing of both light (1 gram to 1,000 grams) and heavy (up to 200 pounds) loads. Position locks and production stops are provided for rapid testing purposes of both light and heavy springs.

28 Claims, 10 Drawing Figures

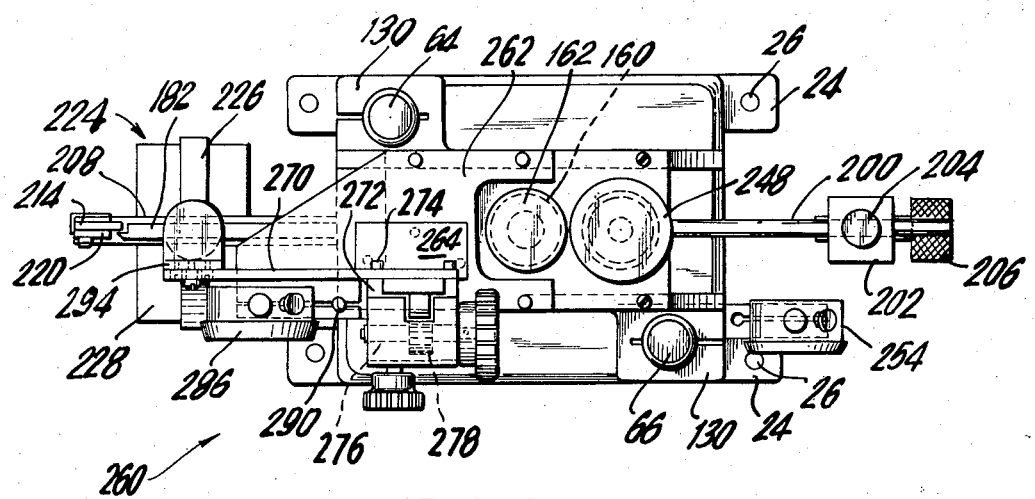
FIG. 2
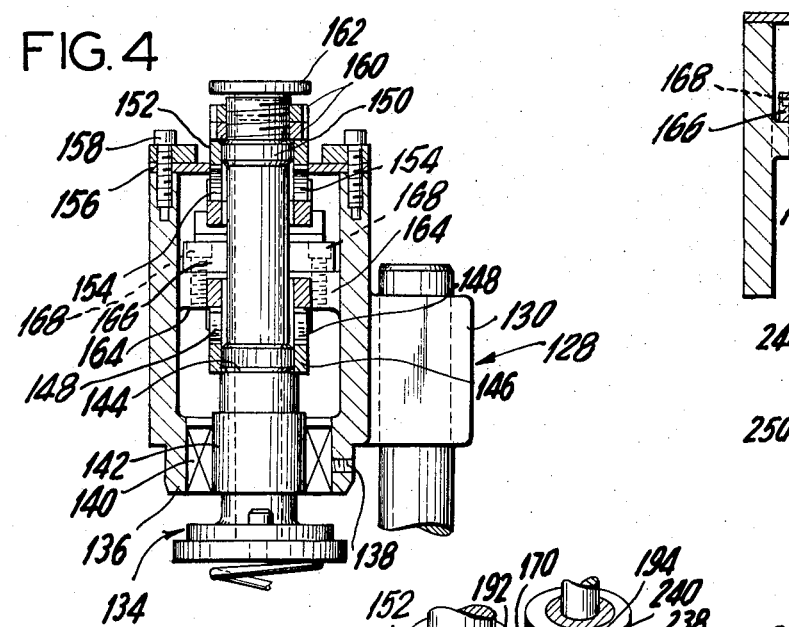
FIG. 4
FIG. 3
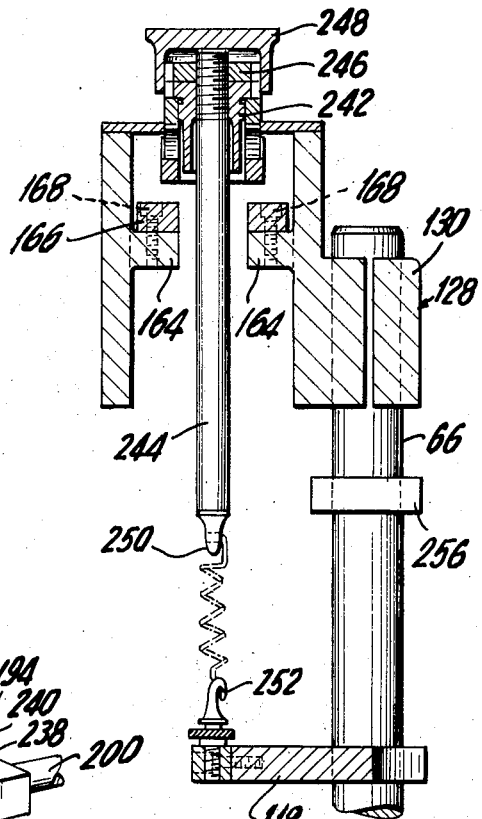
FIG. 5

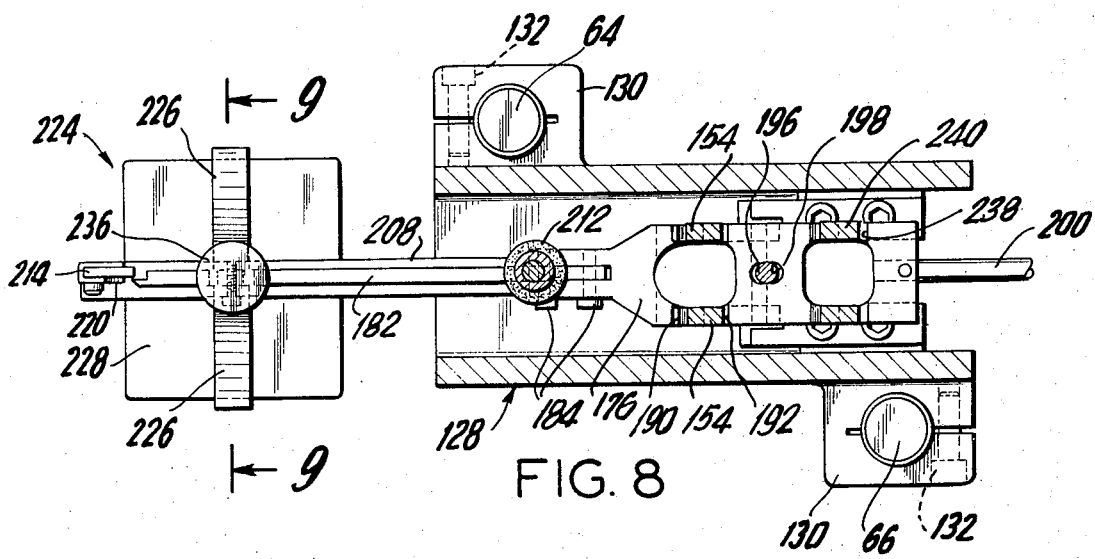
FIG. 8
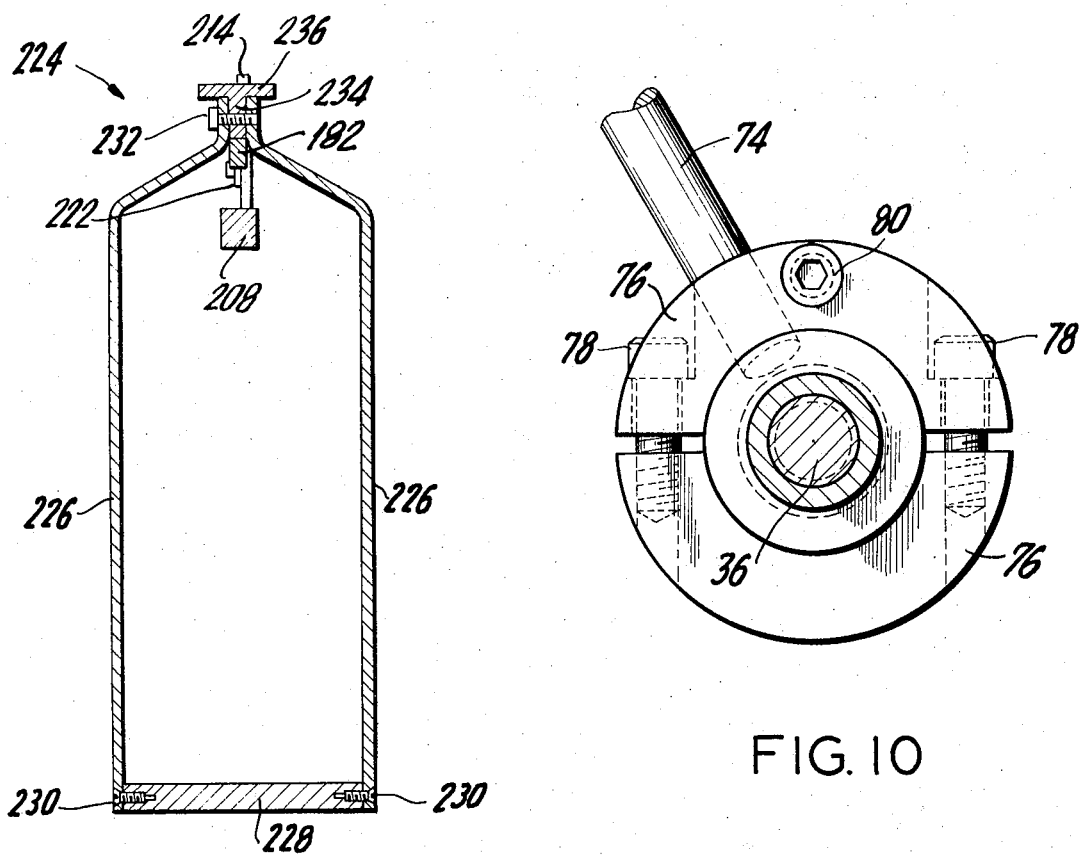
FIG. 9
FIG. 10

SPRING TESTER

This invention relates generally to the spring testing arts.

A primary object of the present invention is to provide a multi-function spring tester that may be used to test either the compression or extension loads, deflections and rates of both light (1 gram to 1,000 grams) and heavy (up to 200 pounds) load springs; which may be used for production testing or for testing for characteristics of individual springs on a non-production basis; and which is highly accurate, reliable and operable with a minimum of difficulties.

In its broadest aspect, the present invention provides counterpoised beam members on one of which may be hung carefully calibrated weights. The beam members are accurately balanced on V-shaped knife edges in V-shaped recesses which are located at a specific ratio with respect to each other, with respect to the weights and with respect to the springs under test.

Various objects, features and advantages of the invention will, in part, be pointed out with particularity and will, in part, become obvious from the following more detailed description of the invention taken in conjunction with the accompanying drawing, which forms an integral part thereof.

BRIEF DESCRIPTION OF THE DRAWING

In the various figures of the drawing, like reference characters designate like parts.

IN THE DRAWING

Figure 1:
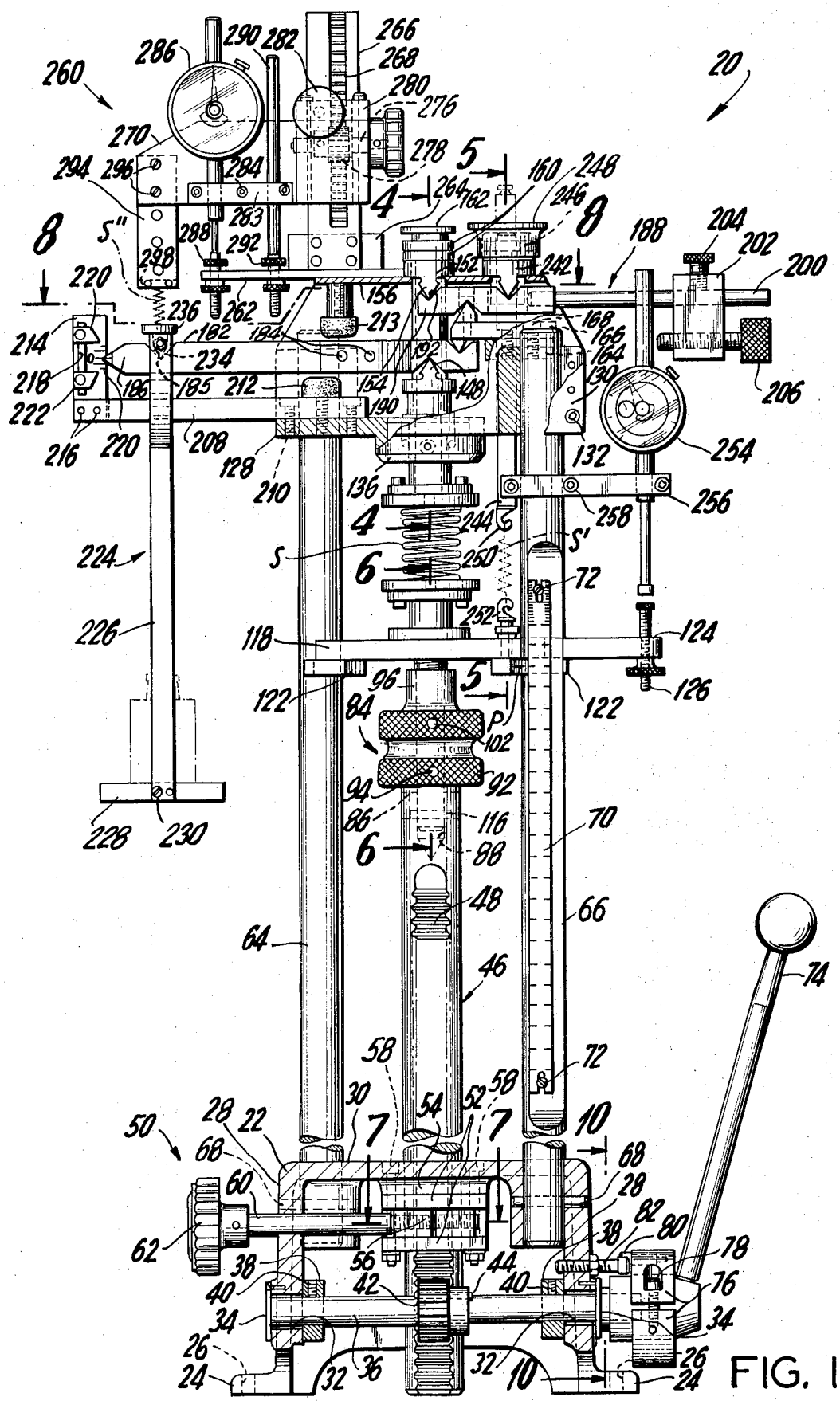
Figure 6:
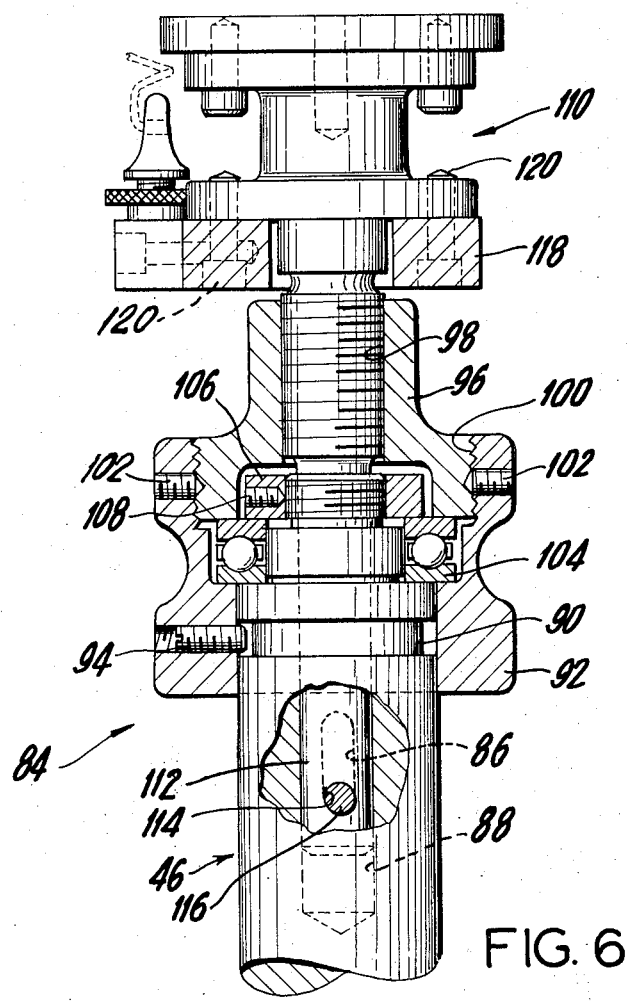
Figure 7:
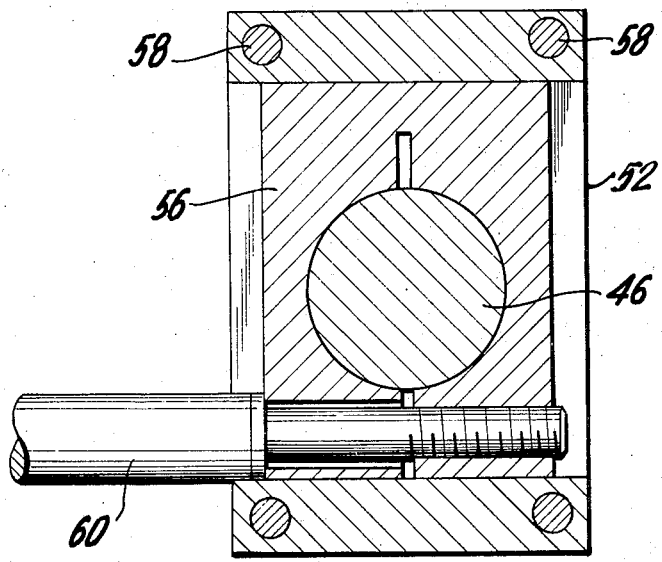

FIG. 1 is a front elevational view of the present invention, partially broken away;

FIG. 2 is a plan view of the present invention;

FIG. 3 is a fragmentary, perspective, elevational view illustrating the knife edge mounting employed with the present invention;

FIG. 4 is a fragmentary, sectional, elevational view taken along line 4—4 of FIG. 1;

FIG. 5 is a fragmentary, sectional, elevational view taken along 5—5 of FIG. 1;

FIG. 6 is a fragmentary, elevational view taken along line 6—6 of FIG. 1;

FIG. 7 is a fragmentary, sectional plan view taken along line 7—7 of FIG. 1;

FIG. 8 is a sectional, fragmentary, plan view taken along line 8—8 of FIG. 1;

FIG. 9 is a sectional, elevational view of one of the weight hangers used with the present invention; and FIG. 10 is a fragmentary, sectional end view taken along line 10—10 of FIG. 1.

DESCRIPTION OF THE PREFERRED EMBODIMENT

The spring tester comprising the present invention is designated generally by the reference character 20. For the purpose of this description, the spring tester 20 will be described first in connection with the testing of the compression load, deflection and rate of spring S shown in FIG. 1. As will be described hereinafter, the tension of spring S' may also be checked as can a relatively light spring designated by the reference character S''.

Referring first to FIGS. 1, 7 and 10, it will be seen that the spring tester 20 includes a cast metal base member 22 having feet 24 that are adapted to be secured to a support table or bench (not shown) by any suitable fastener means. Holes 26 are formed in the feet 24 for this purpose. The base member 22 is further comprised of upstanding side walls 28 and a top wall 30. Aligned holes 32 are formed in two opposed side walls 28 in order to receive eccentric bushings 34. A transverse shaft 36 is received in the eccentric bushings 34 and is axially secured relative to the side walls 28 by means of collars 38 and set screws 40. A pinion 42 is secured to the shaft 36 by means of a key 44.

A central column 46 is journaled in the top wall 30 of the base member 22 and has an axially extending rack 48 formed on the outside surface thereof. The pinion 42 mates with the rack 48. Proper meshing of the rack 48 and the pinion 42 is achieved by rotating the eccentric bushings 34 by means of a spanner wrench about the axis of the shaft 36 through the required arc. It should be noted at this time that the table or platform on which the spring tester 20 is mounted is provided with an opening therethrough permitting axial movement of the column 46. When it is desired to hold the column at any given position a brake, generally designated by the reference character 50, is employed. A pair of plates 52 are secured to a boss 54 that is formed integrally with the lower surface of the top wall 30. A split clamp 56 is secured between the plates 52 by means of screws 58. A shaft 60 having a knob 62 on the outermost end thereof is journaled in a side wall 28 of the bottom support member 22 and has its innermost end threadably received in one leg of the split clamp 56 which surrounds the central column 46.

A pair of support guide columns 64 and 66 are also mounted in the base member 22, in two diagonally opposed corners thereof. The columns 64 and 66 extend through the top wall 30 and are secured thereto by means of pins 68. For purposes to be described hereinafter, the guide column 66 is provided with a scale member 70 that is removably secured thereto by means of screws 72.

The central column 46 is moved axially through the pinion 42 by means of a handle 74 that is secured to the outermost end of the shaft 36. The innermost end of the handle 74 is provided with a split hub 76 that is adjustably clamped to the handle 74 and thereby to the transverse shaft 36 in any angular orientation by means of screws 78. A screw 80, having an axis substantially parallel to the axis of the transverse shaft 36, is threaded into the inner face of the split hub clamp 76 and is positioned in opposition to a similar screw 82 that is threaded into the outer surface of the sidewall 28 of the support base 22. The combination of the screws 80 and 82 provide production stops that limit the angular movement of the handle 74 since the angular position of the screw 80 is adjustable relative to the screw 82.

Whereas the handle 74 provides for coarse axial movement of the central column 46, fine adjustment means generally designated by the reference character 84 and shown in enlarged detail in FIG. 6, permits a fine adjustment or vernier type movement of the column 46. The uppermost end of the central column 46 is provided with an axially oriented, transverse slot 86, a central, axially extending bore 88 and an annular groove 90. A vernier nut 92 is mounted on the upper end of the central column 46 and is secured thereto by means of a set screw 94 that engages the annular groove 90 so as to permit rotational movement of the nut 92 with respect to the shaft 46 but which can also be used to lock the vernier nut 92 to prevent rotation thereof. A vernier plug 96 having an internally threaded bore 98 is secured coaxially within the vernier nut 92 by means of threads 100 and set screws 102. A ball bearing assembly 104 is lightly captured between the vernier nut 92 and the vernier plug 96 permitting rotation thereof and is secured thereto by means of a nut 106 that is, in turn, rigidly secured to the threaded upper end of the shaft 46 by means of a set screw 108.

A vernier screw, generally designated by the reference character 110, is received in the threaded bore 98 of the vernier plug 96. The lower end 112 of the vernier screw 110 is provided with a transverse bore 114 in which is positioned a pin 116. The lower end 112 of the vernier screw 110 is slidably recieved in the axial bore 88 formed at the upper end of the central shaft 46 and the pin 116 is movable in an axial direction within the confines of the slot 86 formed at the upper end of the shaft 46. Thus, when the vernier nut 92 is rotated manually. the vernier screw 110 is capable of moving axially within the limits defined by the slot 86 in order to provide for a fine adjustment in the axial direction of the central shaft 46.

A plate 118 is secured to the vernier screw 110 by means of fasteners 120. At the outboard ends of the plate 118, which is in a plane transvers to the axis of the central shaft 46, there are provided guide plates 122 (FIG. 1). The guide plates 122 have an arcuate cutout in the free ends thereof that are in opposition to the columns 64 and 66 so that as the central shaft 46 moves axially together with the verner screw 110, the plate 118 and the guides 122 that are secured thereto prevent any rotation, misalignment or tipping of the shaft 46. A bar 124 (FIG. 1) is also mounted on the plate 118 in order to support a threadably adjustable dial indicator stop member 126.

The support columns 64 and 66 terminate at their upper ends in a head member or top casting 128 that is illustrated in FIGS. 1, 4, 5 and 8. As best shown in FIG. 8, a pair of lugs 130 are formed integrally with the casting 128 with the lugs 130 being slotted to slidably receive the columns 64 and 66. Screws 132 are used to clamp the lugs 130 about the support columns 64 and 66 when the top casting 128 has been moved to a convenient height relative to the support table for the spring tester 20.

As shown best in FIG. 4, an upper, tubular compression shaft 134 is journaled in a boss 136 that extends downwardly from the lower transverse wall of the upper support casting 128. A set screw 138 threaded into the boss 136, bears against a ball bearing race 140 that surrounds and engages an enlarged diameter hub portion 142 of the upper compression shaft 134. The upper compression shaft 136 is further provided with a shoulder 144 on which rests a tubular member 146. A first pair of diametrically opposed, upwardly directed V-shaped knife edges 148 are formed integrally with the tubular member 146 as shown in FIGS. 1, 3 and 4. A second, axially spaced shoulder 150 is formed proximate the upper end of the compression shaft 134 in order to support a second tubular member 152 on which is formed integrally a second pair of diametrically opposed V-shaped knife edges 154 that are directed downwardly or in opposition to the first pair of knife edges 148. The upper end of the compression shaft 134 extends through a cover plate 156 that is secured to the upper housing 128 by means of screws 158. A pair of lock nuts 160 are threadably mounted on the upper end of the compression shaft 134 in order to prevent axial movement thereof relative to the upper housing 128, and an adapter cap 162 is mounted on top of the shaft 134.

A pair of shelves 164 (FIG. 4) extend inwardly from the side walls of the upper housing 128 and have a double fulcrum, V-shaped knife edge 166 (FIG. 3) secured thereto by means of screws 168. The double fulcrum knife edge 166 comprises a third pair of upwardly directed, V-shaped knife edges 170 and a fourth pair of downwardly directed, V-shaped knife edges 172.

A pointer beam assembly generally designated by the reference character 174 is mounted on the knife edges 148 and 172. As shown in FIGS. 1 and 3, the pointer beam assembly 174 is comprised of a yoke like member 176 having a first pair of laterally spaced apart, downwardly directed V-shaped recesses 178 that are arranged to receive the knife edges 148. A second pair of laterally spaced apart, upwardly directed V-shaped recesses 180 are arranged to receive the knife edges 172. A pointer 182 is secured to the member 176 by means of screws 184. The pointer 182 is also provided with a single V-shaped recess 185 proximate its outer, pointed end 186.

A balance beam assembly generally designated by the reference character 188 (FIG. 1) is also mounted on the double fulcrum knife edge 166. The balance beam assembly 188 is comprised of a pair of arms 190 (FIG. 3) in which are formed a third pair of upwardly directed, V-shaped recesses 192 that are positioned to receive the downwardly extending knife edges 154 at the upper end of the compression shaft 134. A fourth pair of downwardly facing, V-shaped recesses 194 are formed in the underside of the balance beam assembly 188 at the right of the recesses 192 as shown in FIGS. 1 and 3. The recesses 194 are positioned so as to receive the knife edges 170. In order to assure accurate centering of the balance beam 188 with respect to the double fulcrum 166 a pin 196 (FIG. 8) is press fit into the double fulcrum on the center line thereof in the area of the upwardly facing knife edges 170. The pin 196 is received in an elongated slot or hole 198 that is formed in the balance beam assembly on the center line of the V-shaped recess 194.

The balance beam assembly 188 further includes a rod 200 (FIG. 1) that is secured thereto and which extends outwardly from one end. A counter-weight 202 is slidably mounted on the rod 200 and may be secured at any given position thereon by means of a screw 204. Movement of the block 202 provides a coarse adjustment for balancing purposes which will be described hereinafter. A fine adjustment is provided by means of a large headed screw 206 that is threaded into the block 202. When the approximate position of the block 202 has been determined and when the block 202 has been secured at that position by means of the screw 204, the screw 206 is threaded either inwardly or outwardly with respect to the axes of the knife edges. The weight of the large headed screw 206 provides the fine adjustment for counterbalancing purposes.

A tolerance support bar 208 is secured to the transverse base wall of the upper housing 128 by means of screws 210. A resilient bumper 212 is secured to the support bar 208 directly underneath the pointer 182 at the leftward end of the pointer beam assembly 174.

A resilient bumper 213 is secured to and depends downwardly from the cover plate 156 and is positioned directly above the pointer 182 of the pointer beam assembly 174. The tolerance plate 214 is secured to the outer end of the tolerance support bar 208 by means of screws 216 and is provided with an elongated vertically extending slot 218 and a plurality of indicia 220. Upper and lower tolerance markers 220 and 222 are slidably mounted in the slot 218 as shown in FIG. 1.

A weight hanger generally designated by the reference character 224 (FIG. 9) is comprised of a pair of straps 226 and a platform 228 that is secured to the lower end of the straps 226 by means of screws 230 as shown in FIG. 9. Intermediate the upper ends of the straps 226 there is secured, by means of screw 232, a single V-shaped knife edge 234 that is received in the single, upwardly facing V-shaped recess 185 formed in the left hand end of the pointed beam assembly. A platform 236 is formed on the upper end of the knife edge 234.

On a fifth pair of upwardly directed V-shaped recesses 238 (FIG. 3) formed on the upper surface of the balance beam assembly 188 there is mounted a fifth pair of diametrically opposed, downwardly directed V-shaped knife edges 240. A tubular adapter 242 (FIG. 5) is positioned within the hollow knife edges 240 and has threadably secured thereto an elongated shaft 244. A lock nut 246 is mounted on the threaded end of the shaft 244 above the adapter 242 and is covered by a cap 248. At the lower end of the shaft 244 there is provided a first hook 250 that is in spaced opposition to a second hook 252 in order to support the tension spring S' therebetween for test purposes. The second hook 252 is threadably secured to the bar 124 affixed to the axially movable plate 118 in which the stop 126 is positioned. A dial indicator 254 is mounted on a bar 256 so as to be in linear opposition to the stop member 126. A laterally extending bar 256 is secured to the vertical guide column 66 by means of screws 258.

Light spring testing apparatus is shown in FIGS. 1 and 2. The apparatus, generally designated by the reference character 260, is comprised of a support plate 262 that is secured to the cover plate 156 by means of suitable fasteners. A block 264 is mounted on the support plate 262 and a rack bar 266 is secured to the block 264. A rack 268 is mounted on the rack bar 266. A side plate 270 is positioned behind the rack bar 266 and has secured thereto a pair of bars 272 that are positioned on opposite sides of the rack bar 266. Screws 274 are used for this purpose. A shaft 276 is journaled in the bars 272 and has secured thereto a pinion 278 that is in meshing engagement with the rack 268. A brake plate 280 is mounted on the bars 272 and is provided with a knob 282 by which means pressure can be applied to thereby prevent relative movement between the rack 266 and the pinion 278. A clamp bar 283 is mounted on the slide plate 270 by means of screws 284 in order to support a dial indicator 286 that is in opposition to a first stop member 288 that is mounted on the support plate 262 and a stop rod 290 that is mounted in opposition to a second stop member 292 that is also mounted on the support plate 262. The light spring tester 260 is completed by means of an upper support bar 294 that is secured to the slide plate 270 by means of screws 296. At the lower end of the support bar 294 is a transverse support plate 298 that is in opposition to the flat top of the member 236. Light springs S'' may be positioned between the plate 298 and the member 236 as shown in FIG. 1. Small hooks can be held in the platform 236 and the plate 298 so that small extension springs can also be tested.

The foregoing represents a structural discussion of the spring tester 20 comprising the present invention. However, before explaining the various modes of operation, several important structural and functional relationships should be mentioned as follows:

1. The four, knife edge/recess pairs 148/178, 154/192, 170/194 and 180/172 all cooperate in testing compression springs. In each instance the included angle of the V-shaped recesses is greater than the included angle of its respective V-shaped knife edge.

2. The fifth, knife edge/recess pair 240/238 cooperates with the first four pairs of knife edge/recess pairs when testing extension springs. The V-shaped recess 238 has a greater included angle than the V-shaped knife edge 240.

3. The knife edge/recess pair 154/192 and the knife edge/recess pair 240/238 are both equidistant from the knife edge/recess pair 170/194.

4. Assuming that the distance between the knife edge/recess pair 148/178 and the knife edge/recess pair 180/172 is a unit of one, then the distance between the knife edge/recess pair 180/172 and the knife edge/recess 185/234 at the left hand end of the pointer beam assembly 174 is a unit of ten.

5. To test a ten pound compression spring S, a one pound weight is placed on the platform 228.

6. To test a one gram spring S'', a ten gram weight is placed on the cap 248. Larger weights may be placed in a hanger (not shown) suspended on the hook 250.

7. A reference weight, for example one pound, is placed on the platform 228 when testing the load of a spring at a given compression or a given extension.

MODE OF OPERATION

A. To check compression accuracy, the balance beam assembly 188 is adjusted so that the pointer beam assembly 174 oscillates freely without a load and stops at the zero mark on the scale 220. A tolerance of plus or minus one thirty-second inch is acceptable. A one pound weight is placed on the platform 228 and then the transverse plates at the upper end of the column 46 and at the lower end of the compression shaft 134 are brought together. The pointer beam assembly should then line up with the zero marker on the scale 220 and the length pointer on the right guide 122 should be aligned with the zero inch line on the vertical scale 70. The dial indicator 254 may also be used for this purpose.

B. To check extension accuracy, a one pound weight is placed on the platform 228. The center column 46 is raised and a 1 inch gauge is placed between the hooks 250 and 252. The length pointer P on the right guide 122 should line up with the one inch line on the vertical scale 70 with the pointer beam assembly 174 at the zero marker on the scale 220. The dial indicator 254 may also be used for this purpose.

C. To establish tolerance limits, a 10 pound weight (marked 100 pounds) is placed on the platform 228 if the test is to be made for 100 pounds plus or minus 5 percent. The spring to be tested is compressed so that the pointer beam assembly 174 is at the zero marker on the scale 220. A ½ pound weight (marked 5 lbs.) which is 5 percent of the 100 pound test is added to the platform 228 and then the lower tolerance marker 222 is moved into position opposite the deflected pointer beam assembly 174. The top marker 220 then may be moved an equal distance above the zero marker.

D. To test for compression, the beam assemblies 174 and 188 are balanced to oscillate. The spring S is compressed to the exact length desired using the arm 74 to raise the column 46 and then weights are added to the platform 228 until the pointer beam assembly 174 is at the zero marker on the scale 220.

E. To test for extension, a spring S' is placed on the upper hook 250 and then the beam assembly 188 is balanced, using the block 202 and the fine adjustment 206. The lower end of the spring S' is then connected to the lower hook 252. The spring is extended to any desired length using the handle 74 to axially displace the column 46 and then weights are added to the platform 228 until the pointer beam assembly 174 is at the zero marker on the scale 220.

F. To test for initial tension, a spring S' is placed on the hooks 250 and 252 and is then extended any amount using the handle 74 to axially displace the column 46. Weights sufficient to balance are placed on platform 228 and the first load, for example, 9 pounds, is then noted with the deflection observed on length scale 70, say one-half inch. The spring S' is then extended a second time for a distance that is exactly the same as the first extension (one-half inch) and the second load, for example 14 pounds, is noted. The difference in these two loads subtracted from the first load is the initial tension. That is, 14 pounds minus 9 pounds equals 5 pounds, which is then subtracted from 9 pounds in order to arrive at the 4 pounds of initial tension.

G. To test the rate or pounds per inch or gradient, the spring S is deflected for any convenient distance and the first load is then noted. The spring S is then compressed any convenient second distance and the second load is noted. The difference in the two loads divided by the amount of the second deflection is the spring rate. Using the example given in paragraph "F", 14 pounds minus 9 pounds equals 5 pounds and this is divided by one-half inch to provide the answer of 10 pounds per inch rate.

H. To test a light spring, for example 10 grams, the Spring S'' is placed between the platform 236 and the plate 298. A 100 gram weight is then placed on the cap 248. It will now be noted that there is a reverse ratio of 10 to 1. That is, a 100 gram weight checks a 10 gram spring load. Larger weights may be placed in a hanger (not shown) suspended on the hook 250.

From the foregoing, it will be appreciated that an improved multi-function spring tester has been provided for testing both compression and extension springs. A balance beam system may be used for both production testing and for the testing of individual springs. The improved dead weight tester is a highly accurate precision instrument for general use and for high production testing weights between one-half ounce and 200 pounds, and embodying a light load spring tester for testing loads from 1 to 1,000 grams. The upper head assembly can be lowered on guide rods to test short springs or extended on long rods to test long springs. Because the upper head assembly can be brought down to eye level, a substantial saving in time and production testing is realized in addition to providing greater convenience. The dial indicators, for checking small deflections in thousandths of an inch, for both heavy and light load testing of springs, may be used and convenient production stops may be used where speed is required. The vertical central column may be moved over relatively large distances by means of a convenient handle or a fine vernier adjustment may be used for axial displacement of the central column. The balance beam assembly may be coarsely adjusted by sliding a block or a fine adjustment may be used in combination with the block.

There has been disclosed heretofore the best embodiment of the invention presently contemplated. However, it is to be understood that various changes and modifications may be made thereto without departing from the spirit of the invention.

What I claim as new and desire to secure by Letters Patent is:

1. An improved, dead weight tester for compression and extension springs, said tester comprising, in combination:
   a. a base (22);
   b. a head member (128) that is axially adjustable in vertical directions;
   c. means (64, 66) for mounting said head member on said base in spaced relationship therewith;
   d. a first spring support (110, 118) mounted on said base in opposition to said head member;
   e. means (42, 48) for axially moving said first spring support;
   f. first means (134) for positioning a relatively heavy compression spring (S) between said head member and said first spring support;
   g. second means (250, 252) for positioning an extension spring (S¹) between said head member and said first spring support;
   h. a second spring support (244) mounted on said head member;
   j. a pointer beam assembly (174) mounted in said head member;
   k. third means (236, 260) for positioning a relatively light compression spring (S'') between said head member and said pointer beam assembly;
   l. a balance beam assembly (188) mounted in said head member;
   m. platform means (228, 248) on said head member for receiving test weights; and
   n. means (70, 254, 286) for measuring the deflection of the spring under test,
   o. said first, second, and third spring positioning means being located on three parallel, substantially vertical axes, said first spring positioning means being the central one of the three with said second and third spring positioning means being, respectively, on opposite sides thereof, there being further included a double fulcrum member (166) rigidly secured to said head member and having a first element (170) extending in one direction parallel to said axes and a second element (172) extending in an opposite direction parallel to said axes, said balance beam assembly including a bar (190) having a first portion (194) extending in said opposite direction for engaging said first element and second and third portions (192, 238) extending in said one direction on opposite sides of said first portion (194), there being further included third and fourth elements (154, 240 respectively) integral with said head member and extending in said opposite directions for engaging, respectively, said second and third portions and located, respectively, on said axes of said first and second spring supporting means, said pointer beam assembly including a fourth portion (180) extending in said one direction for engaging said second element and a fifth portion (178) extending in said opposite direction, there being still further included a fifth element (148) extending in said one direction for engaging said fifth portion.

2. The tester in accordance with claim 1 wherein said mounting means comprises a pair of columns rigidly secured to said base and wherein said head member is slidably mounted on said column, there being further included means for clamping said head member on said columns at given distance from said base.

3. The tester in accordance with claim 1 wherein said first spring support comprises a column journaled in said base, said column having a transverse surface at the upper end thereof, said means for moving said column comprising a rack formed thereon, a pinion in meshing engagement with said rack, a shaft journaled in said base for rotatably supporting said pinion and a handle secured to said shaft.

4. The tester in accordance with claim 3 wherein there is further included a split collar clamp for adjustably securing said handle to said shaft.

5. The tester in accordance with claim 4 wherein said collar includes a first rotatable stop member extending therefrom and said base includes a second fixed stop member extending therefrom and positioned in the path of said first stop member for selectively limiting the angular movement of said shaft.

6. The tester in accordance with claim 3 wherein there is further included brake means for preventing axial movement of said column at selected times.

7. The tester in accordance with claim 6 wherein said brake means comprises a split collar surrounding said column and a shaft journaled in said base, said shaft having a first threaded end engaged in said collar and a handle at the second end thereof for turning said shaft.

8. The tester in accordance with claim 3 wherein there are further included a pair of eccentric bushings for journaling said shaft in said base whereby the meshing engagement of said rack and said pinion may be adjusted.

9. The tester in accordance with claim 3 wherein said means for axially moving said column further includes fine adjustment means.

10. The tester in accordance with claim 9 wherein said fine adjustment means comprises a collar surrounding said column, means for limiting said collar to rotational movement with respect to said column, a vernier shaft loosely telescoped within said column, means for limiting said vernier shaft to axial movement with respect to said column, a ring mounted on said vernier shaft and thread means for coupling said ring to said vernier shaft and to said collar whereby rotation of said collar causes axial movement of said vernier shaft.

11. The tester in accordance with claim 10 wherein bearing means interposed between said collar and said column are further included.

12. The tester in accordance with claim 10 wherein said means for limiting said collar to rotational movement comprises an annular groove formed on said column and a set screw threaded into said collar, the radially inner end of said set screw being in engagement with said annular groove.

13. The tester in accordance with claim 10 wherein said means for limiting said vernier shaft to axial movement comprises an axially oriented, elongated slot in said column and a transverse pin in said vernier shaft, the ends of said pin engaging said slot.

14. The tester in accordance with claim 1 wherein said one direction is upward and said opposite direction is downward.

15. The tester in accordance with claim 1 wherein said elements are V-shaped knife edges and said portions are V-shaped recesses.

16. The tester in accordance with claim 15 wherein the included angle of said recesses is greater than the included angle of said knife edges.

17. The tester in accordance with claim 1 wherein said second and third portions are equidistant from said first portion.

18. The tester in accordance with claim 1 wherein the distance between the axis of said third spring positioning means and said fourth portion is ten times greater than the distance between said fourth and fifth portions.

19. The tester in accordance with claim 1 wherein said means for axially moving said second spring support comprises a rack gear secured to said head member, a housing slidably supporting said second spring support related to said rack gear and a pinion journalled in said housing and in meshing engagement with said rack gear.

20. The tester in accordance with claim 19 further including brake means for selectively limiting relative movement between said rack gear and said pinion.

21. The tester in accordance with claim 1 wherein said balance beam assembly further includes a slidable counterweight.

22. The tester in accordance with claim 21 wherein said counterweight is a block and there is further included fine adjustment means therefor.

23. The tester in accordance with claim 22 wherein said fine adjustment means is a screw threaded into said block.

24. The tester in accordance with claim 1 wherein said pointer beam assembly includes a bar rigidly secured to said head member, one end of said bar being in opposition to the end of said pointer beam, there being included indicia and tolerance limit markers on said one end of said bar.

25. The tester in accordance with claim 24 wherein said tolerance limit markers are adjustable.

26. The tester in accordance with claim 1 wherein said platform means are mounted on said pointer beam assembly in opposition to said third spring positioning means.

27. The tester in accordance with claim 26 wherein said pointer beam assembly includes a V-shaped recess therein and wherein said platform means includes a V-shaped knife edge positioned in said recess.

28. The tester in accordance with claim 1 wherein said platform means is colinear with said second spring positioning means.

* * * * *